United States Patent
Gascoyne et al.

(10) Patent No.: US 7,052,792 B2
(45) Date of Patent: May 30, 2006

(54) PROTON CONDUCTING POLYMER MEMBRANE FOR ELECTROCHEMICAL CELL

(75) Inventors: John Malcolm Gascoyne, High Wycombe (GB); Thomas Robinson Ralph, Reading (GB); Graham Alan Hards, Reading (GB)

(73) Assignee: Johnson Matthey Public Limited Company, London (GB)

( * ) Notice: Subject to any disclaimer, the term of this patent is extended or adjusted under 35 U.S.C. 154(b) by 349 days.

(21) Appl. No.: 10/204,381

(22) PCT Filed: Mar. 16, 2001

(86) PCT No.: PCT/GB01/01183

§ 371 (c)(1),
(2), (4) Date: Aug. 20, 2002

(87) PCT Pub. No.: WO01/69706

PCT Pub. Date: Sep. 20, 2001

(65) Prior Publication Data

US 2003/0031909 A1 Feb. 13, 2003

(30) Foreign Application Priority Data

Mar. 17, 2000 (GB) .................. 0006429.5

(51) Int. Cl.
*H01M 8/10* (2006.01)
*C08J 5/20* (2006.01)

(52) U.S. Cl. .............................. 429/30; 521/27; 521/25
(58) Field of Classification Search .................. 429/30, 429/13, 33; 521/27, 25
See application file for complete search history.

(56) References Cited

U.S. PATENT DOCUMENTS

| | | | |
|---|---|---|---|
| 3,282,875 A | 11/1966 | Connolly et al. | |
| 4,329,435 A | 5/1982 | Kimoto et al. | |
| 4,330,654 A | 5/1982 | Ezzell et al. | |
| 4,358,545 A | 11/1982 | Ezzell et al. | |
| 4,417,969 A | 11/1983 | Ezzell et al. | |
| 4,433,082 A | 2/1984 | Grot | |
| 4,610,762 A | 9/1986 | Birdwell | |
| 4,940,525 A | 7/1990 | Ezzell et al. | |
| 5,094,995 A | 3/1992 | Butt et al. | |
| 5,384,019 A * | 1/1995 | Keating et al. | ........... 521/27 |
| 5,438,082 A | 8/1995 | Helmer-Metzmann et al. | |
| 5,468,574 A | 11/1995 | Ehrenberg et al. | |
| 5,547,551 A | 8/1996 | Bahar et al. | |

(Continued)

FOREIGN PATENT DOCUMENTS

EP 0 331 321 9/1989

(Continued)

OTHER PUBLICATIONS

Murphy et al., "A Novel Unitized Regenerataive Proton Exchange Membrane Fuel Cell", *NASA Conference Publications*, No. 337, 1996, pp. 83-99.

(Continued)

*Primary Examiner*—Laura Weiner
(74) *Attorney, Agent, or Firm*—RatnerPrestia

(57) ABSTRACT

A novel proton conducting polymer membrane comprising a series of channels and/or capillaries (2) for use in MEAs and fuel cells is provided. Such a membrane allows a supply of water from an external source to be supplied to said membrane allowing water electrolysis to be maintained during incidences of cell reversal in an MEA or fuel cell comprising said membrane. Methods for the construction of such a membrane are also provided.

1 Claim, 1 Drawing Sheet

U.S. PATENT DOCUMENTS

| | | | |
|---|---|---|---|
| 5,595,676 A | 1/1997 | Barnes et al. | |
| 5,599,639 A | 2/1997 | Sansone et al. | |
| 5,635,039 A | 6/1997 | Cisar et al. | |
| 5,834,523 A | 11/1998 | Steck et al. | |
| 5,916,505 A | 6/1999 | Cisar et al. | |
| 5,958,616 A | 9/1999 | Salinas et al. | |
| 6,103,078 A * | 8/2000 | Hitchems et al. | 521/27 |

FOREIGN PATENT DOCUMENTS

| | | |
|---|---|---|
| EP | 0 345 964 | 12/1989 |
| EP | 0 574 791 A2 | 12/1993 |
| EP | 0 791 974 | 8/1997 |
| EP | 0 875 524 | 11/1998 |
| GB | 1050694 | 12/1966 |
| WO | WO 94/16002 | 7/1994 |
| WO | WO 95/08581 | 3/1995 |
| WO | WO 97/25369 | 7/1997 |

OTHER PUBLICATIONS

PCT International Search Report for PCT corresponding application PCTGB01/01183, dated Aug. 1, 2001.

UK Search Report for priority appplication GB 0006429.5, dated Aug. 1, 2000.

Watanabe et al., "Management of the Water Content in Polymer Electrolyte Membranes with Porous Fiber Wicks", Journal of Electrochem. Soc., vol. 140, No. 11, 1993, pp. 3190-3193.

* cited by examiner

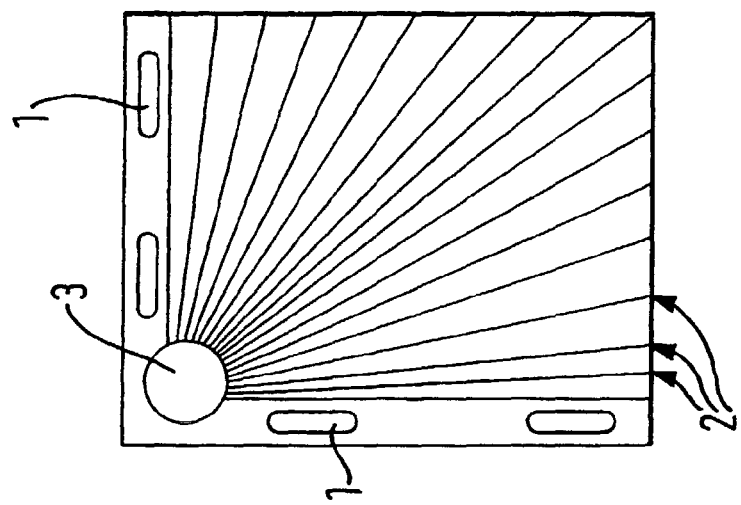
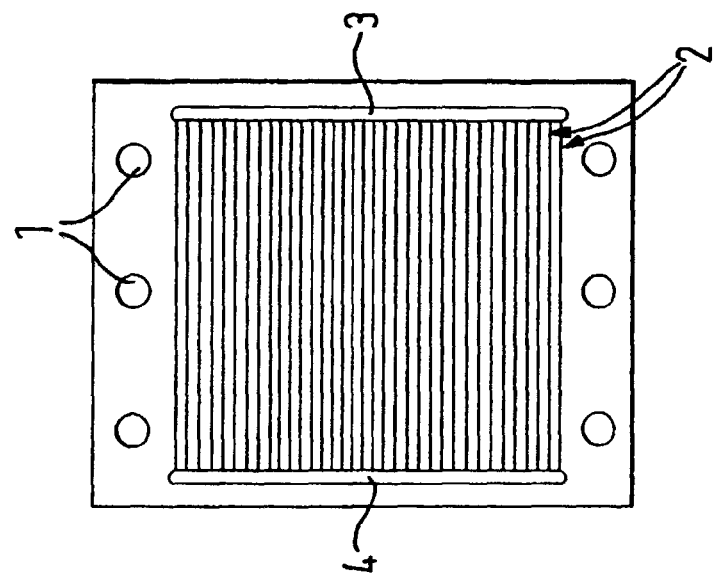
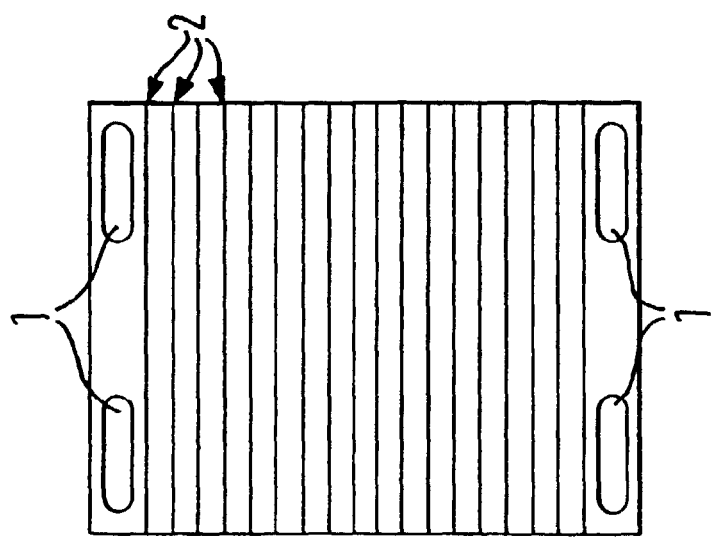

PROTON CONDUCTING POLYMER MEMBRANE FOR ELECTROCHEMICAL CELL

The present invention relates to a novel proton conducting polymer membrane for use in fuel cells. Said membrane contains channels and/or capillaries within the thickness of the membrane which extend to an outer edge of the sheet, or to a selected point within the sheet. When the membrane is used in a fuel cell, water can be supplied to the channels and/or capillaries from an external source. Such a membrane when assembled into a membrane electrode assembly allows for the supply of additional water to the system to sustain water electrolysis during incidences of cell reversal.

A fuel cell is an energy conversion device that efficiently converts chemical energy into electrical energy by electrochemically combining either hydrogen, stored as a gas, or methanol stored as a liquid or gas, with oxygen, normally in the form of air, to generate electrical power. At their fundamental level fuel cells comprise electrochemical cells formed from a solid or liquid electrolyte and two electrodes, the anode side and cathode side, at which the desired electrochemical reactions take place. In the fuel cell the hydrogen or methanol is oxidised at the anode side and the oxygen is reduced at the cathode side to generate the electrical power. Normally in fuel cells the reactants are in gaseous form and have to be diffused into the anode and cathode structures. The electrode structures are therefore specifically designed to be porous to gas diffusion in order to optimise the contact between the reactants and the reaction sites in the electrode to maximise the reaction rate. Efficient removal of the reaction products from the electrode structures is also important. In cases where liquid reactants and products are present the electrode structures often have to be tailored to efficiently feed reactants to and remove products from the reaction sites. The electrolyte also has to be in contact with both electrodes and in fuel cell devices may be acidic or alkaline, liquid or solid in nature. The proton exchange membrane fuel cell (PEMFC), however, is the most likely type of fuel cell to find wide application as an efficient and low emission power generation technology for a range of markets, such as in a range of stationary, residential and portable power generation devices and as an alternative to the internal combustion engine for transportation. In the PEMFC, whether hydrogen or methanol fuelled, the electrolyte is a solid proton-conducting polymer membrane, commonly based on perfluorosulphonic acid materials.

In the PEMFC the combined laminate structure formed from the membrane and the two electrode structures is known as a membrane electrode assembly (MEA). The MEA typically comprises several layers, but in general can be considered to comprise five layers which are dictated by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous. This allows the reactant hydrogen or methanol to enter from the face of the substrate exposed to the reactant fuel supply. The reactant then diffuses through the thickness of the substrate to the layer containing the electrocatalyst, which is usually platinum metal based, to maximise the electrochemical oxidation of hydrogen or methanol. The anode electrocatalyst layer is also designed to comprise some level of proton conducting electrolyte in contact with the same electrocatalyst reaction sites. With acidic electrolyte types the product of the anode reaction is protons and these can then be efficiently transported from the anode reaction sites through the electrolyte to the cathode layers. The cathode substrate is also designed to be porous and to allow oxygen or air to enter the substrate and diffuse through to the electrocatalyst layer reaction sites. The cathode electrocatalyst combines the protons with oxygen to produce water and is also designed to comprise some level of the proton conducting electrolyte in contact with the same electrocatalyst reaction sites. Product water then has to diffuse out of the cathode structure. The structure of the cathode has to be designed such that it enables the efficient removal of the product water. If water builds up in the cathode it becomes more difficult for the reactant oxygen to diffuse to the reactant sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However it is also the case with proton conducting membrane electrolytes, that if too much water is removed from the cathode structure, the membrane can dry out resulting in a significant decrease in the performance of the fuel cell.

The complete MEA can be constructed by several methods. The electrocatalyst layers can be bonded to one surface of the gas diffusion substrate to form what is known as a catalysed gas diffusion substrate. Two catalysed gas diffusion substrates can be combined with the solid proton-conducting membrane to form the MEA. Alternatively, the solid proton-conducting polymer membrane is first catalysed on both sides to form a catalyst coated membrane (CCM) and then combined with two porous gas diffusion substrates to produce the MEA. Further, one catalysed gas diffusion substrate can be combined with one gas diffusion substrate and a solid proton-conducting polymer membrane that is catalysed on the side facing the gas diffusion substrate to form the MEA.

The materials typically used in the fabrication of the gas diffusion substrate layers of the MEA comprise high density materials such as rigid carbon fibre paper (e.g. Toray TGP-H-60 or TGP-H-90 from Toray Industries, Japan) or woven carbon cloths, such as Zoltek PWB-3 (Zoltek Corporation, 3101 McKelvey Road, St. Louis, Mo. 63044, USA). Substrates such as these are usually modified with a particulate material either embedded within the fibre network or coated on to the large planar surfaces, or a combination of both. Typically these particulate materials comprise a carbon black and polymer mix. The particulate carbon black material is, for example, an oil furnace black such as Vulcan XC72R (from Cabot Chemicals, Billerica, Mass., USA) or an acetylene black such as Shawinigan (from Chevron Chemicals, Houston, Tex., USA). The polymer most frequently used is polytetrafluoroethylene (PTFE). The coating, or embedding, is carried out in order to improve the water management properties, improve gas diffusion characteristics, to provide a continuous surface on which to apply the catalyst layer and to improve the electrical conductivity. More recently, electrode structures based on gas diffusion substrates comprising a non-woven network of carbon fibres (carbon fibre structures such as Optimat 203, from Technical Fibre Products, Kendal, Cumbria, UK) with a particulate material embedded within the fibre network as disclosed in EP 0 791 974 have shown comparable performances to structures based on carbon fibre paper or cloth.

The electrocatalyst materials for the anode and cathode structures typically comprise precious metals, in particular platinum, as these have been found to be the most efficient and stable electrocatalysts for all low-temperature fuel cells such as the PEMFC. Platinum is employed either on its own as the only electrocatalytic metal or in combination with other precious metals or base metals. The platinum based electrocatalyst is provided as very small particles (~20–50 Å) of high surface area, which are usually distributed on and supported by larger macroscopic conducting carbon particles to provide a desired catalyst loading. Conducting carbons are the preferred materials to support the catalyst. Particulate carbon black materials typically employed include Vulcan XC72R and Shawinigan. It is also possible that the platinum based electrocatalyst may not incorporate a support, and in this case it is referred to as an unsupported platinum electrocatalyst.

Each MEA in the PEMFC is sandwiched between electrically conducting flow field plates which are conventionally based on carbon and contain channels that feed the MEA with the reactants and through which the products are removed. Since each MEA typically delivers 0.6–0.7 V, usually between 10 to 100 such MEAs are located between flow field plates to form stacks. These stacks are combined electrically in series or parallel to give the desired power output for a given application.

Recently it has been reported that during prolonged operation some cells in large stacks can go into an undesired condition known as cell reversal. This is shown by the cell potential becoming negative rather than the positive value associated with normal PEMFC operation. Such cell reversals can be due to depletion in the concentration of the reactants at the cathode or anode sides, which can be caused by a number of factors such as restricted gas flow due to blocked flow fields or poor water distribution in the MEA. Allied to this in situations where a fast dynamic response is required, such as in transportation applications, it is possible that the gas flow cannot respond quickly enough to sustain the current demand. Further, if one cell in a stack shows cell reversal it can result in adjacent cells in the stack also showing cell reversal since they are in electrical contact.

If the cell reversal is due to a restricted oxygen concentration at the electrocatalyst sites in the cathode then, to sustain the flow of current, hydrogen is produced at the cathode, $$2H^+ + 2e^- = H_2$$

Since hydrogen production at the cathode is very facile at the platinum based electrocatalysts typically employed the electrode potential is usually only slightly more negative than that for hydrogen oxidation at the anode. The result is that at normal operating current densities the cell voltage is normally slightly negative e.g. −0.1 V. This type of cell reversal does raise safety and durability concerns since hydrogen is being produced in the oxidant side of the cell, a significant quantity of heat is generated and water is no longer being produced at the cathode. This water helps to sustain membrane hydration especially at the membrane-anode interface since it promotes the back-diffusion of water.

The major problem occurs, however, if the hydrogen concentration is restricted at the anode side. In this case to sustain the flow of current, water electrolysis and carbon corrosion can occur, $$2H_2O = O_2 + 4H^+ + 4e^-$$

$$C + 2H_2O = CO_2 + 4H^+ + 4e^-$$

Since both electrode reactions occur at more positive electrode potentials than oxygen reduction at the cathode, again, the cell voltage is negative, but in this case the cell voltage may be as high as −4.8 V at typical operating current densities. While carbon corrosion is favoured over water electrolysis thermodynamically, the electrochemical kinetics of water electrolysis are sufficiently facile at the platinum based electrocatalysts typically employed in the PEMFC that initially water electrolysis principally sustains the current. There is only a small contribution from corrosion of the carbon components in the anode to the cell current. If, however, the anode catalyst becomes deactivated for water electrolysis or if the water concentration at the electrocatalyst sites in the anode becomes significantly depleted, the water electrolysis current is gradually replaced by increased rates of carbon corrosion. In the case of carbon corrosion water need only be present in the vicinity of the relevant, abundant carbon surfaces. During this period the cell voltage becomes more negative (i.e. the anode potential becomes more positive) to provide the necessary driving force for carbon corrosion. This in turn increases the driving force for the water electrolysis reaction. The result if cell reversal is prolonged may be irreversible damage to the membrane and catalyst layers due to excessive dehydration and local heating. Further, the catalyst carbon support in the anode structure corrodes, with eventual dissolution of the platinum based catalyst from the support and the anode gas diffusion substrate may become degraded due to corrosion of the carbon present in the substrate structure. In cases where the bipolar flow field plates are based on carbon the anode flow field plate may also be subjected to significant carbon corrosion, resulting in surface pitting and damage to the flow field pattern.

Therefore it would be a significant advantage if the MEA could be protected from the deleterious effects of cell reversal should a cell go into a reversal situation. This is the problem the present inventors have set out to address.

The major causes of irreversible cell damage that can occur under cell reversal conditions at the anode can be ameliorated if water electrolysis can be sustained by maintaining a sufficiently high water concentration within the MEA. This significantly reduces the potential for the onset of corrosion of the carbon based materials in the anode side of the MEA. To sustain water electrolysis at the anode requires that a supply of water be delivered into the MEA at a rate sufficient to maintain the existing water flux within the MEA whilst supplying additional water to the anode for the water electrolysis reaction.

To achieve such a water supply into the MEA requires a suitable structure within the MEA which can be supplied with water wherein this water is additional to that provided from the humidified reactant and the product water created by the normal functioning of the fuel cell. Such a water source could lie outside of the stack or could feed in from a channel or port within the stack structure. The only requirement being that some form of channel, capillary or other water feed system must interconnect with either an outside edge of the MEA or appropriate points within the MEA where the source of water is located.

Previous approaches to increasing the hydration of solid polymer electrolyte membranes in fuel cells have involved such methods as incorporating wicks into the membrane structure (Watanabe et al, J. Electrochem. Soc., vol. 140, No. 11, 1993). Unfortunately a number of problems with this type of approach have been encountered. Typically modern PEMFCs require solid polymer electrolyte membranes less than 100 microns thick, whereas the membranes described in the literature have been much thicker (of the order of at least 200 microns) with the polyester wicks employed by Watanabe et al of between 60 and 80 microns in diameter, much too large to be capable of producing the thin membranes required by modern PEMFC technology.

Passages have also been created in proton conducting membranes for use in electrochemical cells in order to allow direct fluid flow through the membrane for the purposes of improved hydration. Thus Cisar et al in U.S. Pat. No. 5,635,039 describe the formation of open, substantially unobstructed, parallel internal passages within a proton conducting membrane. The passages are formed by pressing a membrane or two membranes around a plurality of removable elements at sufficient temperature and pressure to fuse the material. The elements are subsequently removed to form the substantially unobstructed, parallel internal passages. In this application, as in previous attempts to introduce water directly into the membrane, large channels typically of the order of 51 to 230 microns in diameter were formed in the proton exchange membranes. These channels are clearly too large to be incorporated into the thin membranes used in modern PEMFC technology. A subsequent patent U.S. Pat. No. 5,916,505 by Cisar et al describes the process for forming the membrane and also describes the inclusion of preformed proton conducting polymer tubes into the cast membranes, but again the channels are large relative to the membrane thickness. A secondary problem with totally open and large holes is that during fabrication of the membrane electrode assembly the anode and cathode structures are pressed at high temperature and pressure onto the membrane. This results in some deformation due to plastic flow of the membrane polymer with the potential for closing-up of the passages, particularly if they are large in comparison to the overall thickness of the membrane.

In this prior art water channels were created in the membrane in order to maintain its hydration. The formation of narrow channels or capillary bores within a proton conducting polymer membrane of a fuel cell in order to facilitate the process of water electrolysis during cell reversal conditions has never before been described. This has been achieved by the present inventors.

Thus, in a first aspect the present invention provides a proton conducting polymer membrane characterised in that said membrane comprises channels or capillaries or a combination thereof such that the dimension of the channels and capillaries in the z direction of the membrane is less than 50 microns. By the z-direction, we mean through the thickness of the membrane and perpendicular to its major planar faces.

In a further aspect the present invention provides a proton conducting polymer membrane characterised in that said membrane comprises channels such that the dimension of said channels in the z direction of the membrane is less than 50 microns.

In a yet further aspect the present invention provides a proton conducting polymer membrane characterised in that said membrane comprises capillaries such that the dimension of said capillaries in the z direction of the membrane is less than 50 microns.

The membranes of the present invention are suitable for use in fuel cells. Another aspect of the present invention is the use of a membrane according to the present invention in a fuel cell wherein water is supplied to the channels and/or capillaries from an external source.

By the term "capillary", we mean a channel small enough to allow water to be pulled through by capillary attraction. By the term "channel", we mean a conduit of cross-sectional dimension greater than that required for capillary attraction. The dimension at which a capillary becomes a channel with respect to water will be strongly influenced by the nature of the surface within that capillary or channel.

The external source is a water supply system that is isolated from the active electrode area. The system comprises a reservoir and the channels and/or capillaries are connected to this reservoir. The reservoir may be adjacent to the fuel cell stack, or may be inside the fuel cell stack.

BRIEF DESCRIPTION OF FIGS.

FIGS. 1–3 show different proton conducting polymer conducting systems wherein the channels and/or capillaries may be supplied with water from an external source. In particular:

FIG. 1 shows a system comprising gas ducts and channels and/or capillaries to which water is supplied directly.

FIG. 2 shows a system comprising gas ducts and channels and/or capillaries to which water is supplied through extensions thereof.

FIG. 3 shows a system comprising gas ducts and channels and/or capillaries which are connected to a water supply through a duct.

In the systems shown in each of the figures, gas ducts (1) and channels and/or capillaries (2) are connected to a water supply. In FIG. 1, gas ducts (1) and channels and/or capillaries (2) extend to the edge of membrane and are directly connected to the water supply. FIG. 2 shows a system comprising gas ducts (1) and channels and/or capillaries (2) wherein the channels and/or capillaries extend to a water supply duct (3) and a water return duct (4). FIG. 3 shows a system comprising gas ducts (1) and channels and/or capillaries (2) connected to a water supply duct (3).

At least a proportion of the channels and/or capillaries extend to an edge of the membrane, or to a selected point within the membrane so that the channels and/or capillaries can be supplied with water from the external source. The proton conducting polymer membrane introduces the ability to sustain water electrolysis under cell reversal conditions preventing the shift to carbon corrosion and consequent irreversible damage to the anode and membrane.

A large number of different spacings and orientations of the channels and/or capillaries are possible within the membrane providing that the final structure allows for the application of an external supply of water to the membrane in the fuel cell. The channels and/or capillaries may be substantially straight and parallel or they may be curved and interconnecting.

Typically the overall thickness of the membrane is less than 100 microns and more preferably it is of thickness less than 60 microns. A membrane having a thickness of 100 microns or less is suitable for use as a membrane in a high performance PEMFC.

The dimension of the channels and/or capillaries in the z direction has to be smaller than the thickness of the membrane. This dimension of the channels and/or capillaries is less than 50 microns, preferably less than 25 microns. The ratio of the channel or capillary dimension in the z direction to the thickness of the membrane is suitably less than 0.5. The size of the channels and/or capillaries should be such that they do not compromise the mechanical strength or the proton conductivity of the membrane.

The number of channels and/or capillaries can be varied according to the requirements of the membrane. The location of the channels and/or capillaries may be substantially central between the two faces of the membrane, or the channels and/or capillaries may be closer to one face of the membrane.

In a further aspect, the present invention provides a method of forming a membrane according to the present invention comprising the step of inserting tow or yarn within said membrane during its formation and subsequently removing at least a proportion of the tow or yarn to form channels. The membrane may be a sheet of proton conducting membrane or may be a composite membrane as described in EP0875524.

A tow is an essentially parallel collection of synthetic fibres preparatory to spinning, and a yarn is a continuous twisted strand.

In one method according to the invention, the membrane comprising channels is formed by taking a sheet of proton conducting membrane, which may or may not be a composite membrane, placing the tow or yarn on the surface of the membrane and then placing a second sheet of proton conducting membrane on top of the tow or yarn. This assemblage can be pressed to produce a single membrane sheet comprising tow or yarn. At least a proportion of the tow or yarn is then removed. A possible method of removal requires the yarn to have been treated by dipping in a high melting paraffin wax. The yarn can then be removed by warming the membrane, to soften the wax, and pulling the yarn out.

In a further method according to the invention the membrane comprising channels is formed by incorporating the tow or yarn into a membrane as it is prepared from solutions of a proton conducting membrane electrolyte, or thermoplastic precursors thereof. For example, the tow or yarn is incorporated into a porous fibre matrix, and then the matrix is filled with a solution of proton conducting membrane electrolyte. Part, or substantially all, of the tow or yarn may be removed from the membrane mechanically once the proton conducting polymer electrolyte has dried sufficiently to prevent the channels so formed from filling with mobile electrolyte, but to such an extent that the membrane is not damaged during removal of the tow or yarn. Alternatively the tow or yarn may be removed by heating the fully dried membrane in aqueous solution to produce minor dimensional change in the proton conducting membrane electrolyte thereby allowing removal of the tow or yarn. If the proton conducting electrolyte is in the thermoplastic form, the process to convert the electrolyte to the acid form can also be used to free the tow or yarn, since heating in potassium or sodium hydroxide and finally sulphuric acid results in a significant level of expansion of the polymer membrane structure. In all cases it is impossible to guarantee removal of all of the fibres.

To generate a capillary structure rather than channels the tow or yarn may be left in-situ. The capillaries result from spaces between the fibres in the tow or yarn. The is dimension of the capillaries is dependent on the dimension and packing of the fibres. Larger fibres will generally result in larger capillaries.

Thus, in a further aspect, the present invention provides a method of forming a membrane, according to the present invention comprising the step of inserting tow or yarn within the membrane during formation of the membrane and leaving it in situ to form capillaries.

In one method according to the invention, the membrane comprising capillaries is formed by taking a sheet of proton conducting membrane, placing the tow or yarn on the surface of the membrane and then placing a second sheet of proton conducting membrane on top of the tow or yarn. This assemblage can be pressed to produce a single membrane sheet containing tow or yarn.

In a further method according to the invention, the membrane comprising capillaries is formed by incorporating the tow or yarn into a membrane as it is prepared from solutions of a proton conducting membrane electrolyte, or thermoplastic precursors thereof. For example, the tow or yarn is incorporated into a porous fibre matrix, and then the matrix is filled with a solution of proton conducting membrane electrolyte.

The continuous tow or yarn used to form channels and/or capillaries is made up of a plurality of small diameter fibres, selected from the group consisting of glass, quartz or silica. Suitably the individual fibres in the tow or yarn should be of 10 microns or less in diameter, typically in the range of 0.1 to 10 microns, suitably 0.2 microns to 7 microns and with the tow or yarn comprising a collection of 1000 fibres or less. When forming channels, the number of fibres used will be determined by the desired diameter of the channels. When forming capillaries, the number of fibres used will be determined by the desired number and spacing of capillaries. The cross sectional shape of the tow or yarn may be substantially circular, as a flat tape or any intermediate configuration. The maximum length of the tow or yarn is determined by the x and y dimensions of the membrane and the orientation of the tow or yarn within the membrane. For example, the continuous strand may extend from one edge of the membrane to any one of the other edges, or the continuous strand may extend from one edge of the membrane to the same edge. In all cases, the length of the fibres will be dependent on the length of the continuous strand.

The continuous tow or yarn embedded within the membrane may be present at an equal depth or at varying depths (i.e. variation in the z-direction) providing that there is sufficient polymer both above and below the tow or yarn to form a structurally sound membrane. The strands may be applied at any orientation and at any spacing, either as a straight line or in a sinusoidal manner of any frequency or amplitude, or any combination of the two.

A further method by which internal channels can be generated within the membrane is by the application of metal wires either placed within a suitable solution of the membrane electrolyte or hot pressed into the solid form of the membrane electrolyte using temperatures above the glass transition temperature of the membrane electrolyte (i.e. typically from 150 to 220° C.) for up to 5 minutes at sample pressures from 500 to 2000 psi. The wires can subsequently be removed mechanically or by placing the membrane in aqueous solution to induce dimensional expansion in the membrane electrolyte. Suitable wires include niobium and platinum wires having diameters of less than 50 microns. Channels produced by this method would have to be substantially straight to enable extraction of the wire.

Thus in a further aspect, the present invention provides a method of forming a membrane according to the present invention comprising the step of inserting metal wires within the membrane during its formation and subsequently removing them substantially to form substantially straight channels.

The membrane with channels and/or capillaries may be catalysed with the platinum based electrocatalysts normally employed in fuel cell reactions to form a catalyst coated membrane (CCM) and placed adjacent to typical gas diffusion substrates employed in the PEMFC to form an MEA or alternatively combined with catalysed cathode and anode substrates to form an MEA.

Additionally the tow, yarn or metal wire may be removed after the fabrication of a CCM or MEA by treatment in aqueous solution.

Thus, in a further aspect the present invention provides an MEA comprising a membrane according to the present invention.

Such a membrane with channels and/or capillaries when incorporated in an MEA will not only produce the benefit of improved tolerance to cell reversal, but will also offer improved performance at low reactant gas pressures close to ambient pressure, where gas flow rates are higher at a given reactant stoichiometry, and at lower levels of reactant gas humidification. Both low pressure and low humidification are advantageous from a fuel cell stack system efficiency viewpoint. This will be achieved as a result of the ability to humidify the membrane externally and as a result of the higher water content of the membrane improving the tolerance to membrane drying, which results in a significant loss in fuel cell performance due to the increased ohmic drop across the membrane electrolyte.

In a final aspect, the present invention provides a method of operating a fuel cell under cell reversal conditions, comprising the use of a membrane according to the present invention to allow a supply of additional water within the membrane electrode assembly.

The proton conducting polymers suitable for use in the present invention may include, but are not limited to:

1) Polymers which have structures with a substantially fluorinated carbon chain optionally having attached to it side chains that are substantially fluorinated. These polymers contain sulphonic acid groups or derivatives of sulphonic acid groups, carboxylic acid groups or derivatives of carboxylic acid groups, phosphonic acid groups or derivatives of phosphonic acid groups, phosphoric acid groups or derivatives of phosphoric acid groups and/or mixtures of these groups. Perfluorinated polymers include Nafion®, Flemion® and Aciplex® commercially available from E. I. DuPont de Nemours (U.S. Pat. Nos. 3,282,875; 4,329,435; 4,330,654; 4,358,545; 4,417,969; 4,610,762; 4,433,082 and 5,094,995), Asahi Glass KK and Asahi Chemical Industry respectively. Other polymers include those covered in U.S. Pat. No. 5,595,676 (Imperial Chemical Industries plc) and U.S. Pat. No. 4,940,525 (Dow Chemical Co.)

2) Perfluorinated or partially fluorinated polymers containing aromatic rings such as those described in WO 95/08581, WO 95/08581 and WO 97/25369 (Ballard Power Systems) which have been functionalised with $SO_3H$, $PO_2H_2$, $PO_3H_2$, $CH_2PO_3H_2$, COOH, $OSO_3H$, $OPO_2H_2$, $OPO_3H_2$. Also included are radiation or chemically grafted perfluorinated polymers, in which a perfluorinated carbon chain, for example, PTFE, fluorinated ethylene-propylene (FEP), tetrafluoroethylene-ethylene (ETFE) copolymers, tetrafluoroethylene-perfluoroalkoxy (PFA) copolymers, poly (vinyl fluoride) (PVF) and poly (vinylidene fluoride) (PVDF) is activated by radiation or chemical initiation in the presence of a monomer, such as styrene, which can be functionalised to contain an ion exchange group.

3) Fluorinated polymers such as those disclosed in EP 0 331 321 and EP 0345 964 (Imperial Chemical Industries plc) containing a polymeric chain with pendant saturated cyclic groups and at least one ion exchange group which is linked to the polymeric chain through the cyclic group.

4) Aromatic polymers such as those disclosed in EP 0 574 791 and U.S. Pat. No. 5,438,082 (Hoechst AG) for example sulphonated polyaryletherketone. Also aromatic polymers such as polyether sulphones which can be chemically grafted with a polymer with ion exchange functionality such as those disclosed in WO 94/16002 (Allied Signal Inc.).

5) Nonfluorinated polymers include those disclosed in U.S. Pat. No. 5,468,574 (Dais Corporation) for example hydrocarbons such as styrene-(ethylene-butylene)-styrene, styrene-(ethylene-propylene)-styrene and acrylonitrile-butadiene-styrene co- and terpolymers where the styrene components are functionalised with sulphonate, phosphoric and/or phosphonic groups.

6) Nitrogen containing polymers including those disclosed in U.S. Pat. No. 5,599,639 (Hoechst Celanese Corporation), for example, polybenzimidazole alkyl sulphonic acid and polybenzimidazole alkyl or aryl phosphonate.

7) Any of the above polymers which have the ion exchange group replaced with a sulphonyl chloride ($SO_2Cl$) or sulphonyl fluoride ($SO_2F$) group rendering the polymers melt processable. The sulphonyl fluoride polymers may form part of the precursors to the ion exchange membrane or may be arrived at by subsequent modification of the ion exchange membrane. The sulphonyl halide moieties can be converted to a sulphonic acid using conventional techniques such as, for example, hydrolysis.

The membranes themselves may be of a composite type as for example described in EP 0 875 524 (Johnson Matthey PLC), U.S. Pat. No. 5,834,523 (Ballard Power Systems Inc.) and U.S. Pat. No. 5,547,551 (W. L. Gore & Associates Inc.). Alternatively a layered or laminate membrane may be used, in which at least one of the layers is the membrane of the invention.

A further aspect of the present invention relates to a fuel cell comprising an MEA or a membrane according to the present invention.

It will be appreciated that variations can be made to the invention herein described without departing from the present inventive concept.

The following examples are illustrative but not limiting of the invention:

EXAMPLE 1

Membrane Comprising Capillaries

A 10 cm×10 cm sheet of Nafion membrane, type NR-111 (nominal thickness 0.025 mm, supplied by E. I. Du Pont de Nemours & Co. (Inc), Polymer Products, Fayetteville, N.C.) was placed on a sheet of skived PTFE and a series of straight lengths of quartz yarn (Quartzel yarn C9 17Z20 QS13 supplied by Quartz et Silice BP 521-77794 Nemours, Cedex, France) were spaced at 0.5 cm intervals across the surface. A second 10 cm×10 cm sheet of Nafion membrane, type NR-111, was placed on top, followed by a further sheet of skived PTFE. The resultant assemblage was placed in a hydraulic press and compressed to 510 psi (sample pressure) for 1 minute, at 150° C. The membrane so produced had an average thickness of 45 microns.

EXAMPLE 2

Membrane Comprising Channels

A further membrane was produced as for Example 1 with the quartz yarn having first been treated by dipping in a high melting paraffin wax to seal the fibres together. The membrane so produced also had an average thickness of 45 microns. The quartz yarn was removed by warming the membrane, to soften the wax, and pulling the yarn out. The excess wax was removed by Soxhlet extraction with a low boiling petroleum ether.

EXAMPLE 3

Membrane Comprising Capillaries

A mixture of chopped silica fibres (Type QC9/33-20 mm from Quartz et Silice BP 521-77794 Nemours, Cedex, France, 0.185 g), and silica microfibre (Q fibre, type 104 from Johns Manville, Insulation Group, PO Box 5108, Denver, Colo., USA, 0.09 g) were dispersed with mixing, in water (3000 cm$^3$). A porous fibre sheet was fabricated from the resulting mixture in a single step process based on the principles of papermaking technology, as a sheet size of 855 cm$^2$ (33 cm diameter) in a sheet former (design based on standard SCA Sheet former from AB Lorentzen & Wettre, Box 4, S-163 93 Stockholm, Sweden). The porous fibre sheet was left on the wire of the sheet former. A series of straight lengths of quartz yarn (Quartzel yarn C9 17Z20 QS13 supplied by Quartz et Silice BP 521-77794 Nemours, Cedex, France) were spaced at 0.5 cm intervals across the surface of the porous fibre sheet using a jig to maintain them in place under tension. The hand sheet maker was carefully refilled with water. A further mixture of chopped silica fibres (Type QC9/33-20 mm) 0.185 g, and silica microfibre (Q fibre, type 104) 0.09 g was dispersed with mixing, in water (3000 cm$^3$), dispersed in the sheet maker and deposited on the existing porous fibre sheet and yarn. The sheet was removed from the wire and air dried at 150° C.

The porous fibre sheet was placed on a sheet of sintered PTFE and a solution of perfluorosulphonic acid (Nafion® produced by E. I. DuPont de Nemours) in the aqueous form as described in EP 0 731 520 was applied to the fibre matrix. The structure was filled with the aqueous Nafion® to achieve a total solid Nafion® loading of 7.05 mg/cm$^2$. The membrane so produced had an average thickness of 40 microns.

EXAMPLE EVALUATION

The ability of the capillary structure of the in-situ yarn in Example 1 to carry water by capillary action was demonstrated by dipping the exposed ends of the quartz yarn in a bath of water containing a dissolved dye. The dye was carried up the yarn and the membrane showed the characteristic swelling associated with hydration.

In a second experiment each of the Examples were clamped between two sealing gaskets in the base of a small reservoir, such that the top edge of the membrane, with the ends of the yarn (or in the case of Example 2 the channels) exposed. The reservoir was filled with water and over a period the water was observed passing down the yarn or channels to emerge from the bottom edge of the membranes. The membrane also showed the characteristic swelling associated with hydration.

The invention claimed is:

1. A method of forming a membrane having channels or capillaries or a combination thereof such that the dimension of said channels and capillaries in the z direction of the membrane is less than 50 microns comprising the step of placing tow or yarn within said membrane during its formation and subsequently removing at least a portion of the tow or yarn to form channels, wherein the tow or yarn is any one or more of the following: glass, quartz, or silica, wherein a portion of the tow or yarn is left in situ to form capillaries.

* * * * *